United States Patent
Arora et al.

(10) Patent No.: US 11,513,973 B2
(45) Date of Patent: Nov. 29, 2022

(54) ARBITRATION SCHEME FOR COHERENT AND NON-COHERENT MEMORY REQUESTS

(71) Applicant: ADVANCED MICRO DEVICES, INC., Santa Clara, CA (US)

(72) Inventors: Sonu Arora, Cherry Hill, NJ (US); Benjamin Tsien, Santa Clara, CA (US); Alexander J. Branover, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/723,185

(22) Filed: Dec. 20, 2019

(65) Prior Publication Data

US 2021/0191879 A1   Jun. 24, 2021

(51) Int. Cl.
| | | |
|---|---|---|
| *G06F 12/14* | (2006.01) | |
| *G06F 12/06* | (2006.01) | |
| *G06F 12/0877* | (2016.01) | |
| *G06F 9/54* | (2006.01) | |
| *G06F 12/1027* | (2016.01) | |
| *G06F 9/50* | (2006.01) | |
| *G06F 11/30* | (2006.01) | |

(Continued)

(52) U.S. Cl.
CPC ........ *G06F 12/145* (2013.01); *G06F 9/30047* (2013.01); *G06F 9/5022* (2013.01); *G06F 9/544* (2013.01); *G06F 11/3037* (2013.01); *G06F 11/3062* (2013.01); *G06F 12/0653* (2013.01); *G06F 12/0877* (2013.01); *G06F 12/1009* (2013.01); *G06F 12/1027* (2013.01)

(58) Field of Classification Search
CPC ............... G06F 12/145; G06F 11/3037; G06F 11/3062; G06F 12/1027; G06F 12/0877; G06F 9/5022; G06F 9/30047; G06F 12/0653; G06F 12/1009; G06F 9/544
See application file for complete search history.

(56) References Cited

U.S. PATENT DOCUMENTS

| | | | | |
|---|---|---|---|---|
| 8,266,389 B2 * | 9/2012 | Krishnan | ............... | G06F 13/161 |
| | | | | 711/151 |
| 2002/0097727 A1 * | 7/2002 | Prakash | ............... | H04L 47/2408 |
| | | | | 370/395.42 |

(Continued)

OTHER PUBLICATIONS

Wagh, Mahesh, "PCI Express* 3.0 Technology: Device Architecture Optimizations on Intel Platforms", Intel Developer Forum, 2009, 33 pages.

(Continued)

*Primary Examiner* — Aracelis Ruiz (57) ABSTRACT

A processor in a system is responsive to a coherent memory request buffer having a plurality of entries to store coherent memory requests from a client module and a non-coherent memory request buffer having a plurality of entries to store non-coherent memory requests from the client module. The client module buffers coherent and non-coherent memory requests and releases the memory requests based on one or more conditions of the processor or one of its caches. The memory requests are released to a central data fabric and into the system based on a first watermark associated with the coherent memory buffer and a second watermark associated with the non-coherent memory buffer.

19 Claims, 8 Drawing Sheets

(51) Int. Cl.
*G06F 12/1009* (2016.01)
*G06F 9/30* (2018.01)

(56) References Cited

U.S. PATENT DOCUMENTS

| | | |
|---|---|---|
| 2003/0167348 A1 | 9/2003 | Greenblat |
| 2004/0247019 A1* | 12/2004 | McDonough ......... H04B 1/708 |
| | | 375/148 |
| 2005/0149768 A1 | 7/2005 | Kwa et al. |
| 2011/0193988 A1* | 8/2011 | Hatano ................ G06F 15/167 |
| | | 348/222.1 |
| 2013/0061003 A1 | 3/2013 | Millet et al. |
| 2013/0067284 A1 | 3/2013 | Berg et al. |
| 2016/0162421 A1* | 6/2016 | Xiong ................ G06F 13/4068 |
| | | 710/52 |
| 2016/0350222 A1 | 12/2016 | Podaima et al. |
| 2018/0136277 A1 | 5/2018 | Hamid et al. |
| 2018/0173551 A1* | 6/2018 | Dunn ..................... G06F 12/109 |
| 2018/0232320 A1* | 8/2018 | Raval .................. G06F 12/1491 |
| 2018/0349051 A1 | 12/2018 | Daglis et al. |
| 2018/0357169 A1 | 12/2018 | Lai |
| 2019/0303039 A1* | 10/2019 | Teh ..................... G06F 13/1642 |
| 2019/0320491 A1* | 10/2019 | Shukair ............. H04W 72/1268 |
| 2020/0073840 A1* | 3/2020 | Mekad ................. G06F 9/4411 |

OTHER PUBLICATIONS

International Search Report and Written Opinion dated Mar. 26, 2021 for PCT/US2020/064483, 10 pages.
International Preliminary Report on Patentability dated Jun. 30, 2022 for PCT Application No. PCT/US2020/064483, 7 pages.

* cited by examiner

ARBITRATION SCHEME FOR COHERENT AND NON-COHERENT MEMORY REQUESTS

BACKGROUND

To make efficient use of computer resources, a server or other processing system can implement a virtualized computing environment, wherein the processing system concurrently executes multiple virtual machines, or guests. Resources of the processing system are provided to the guests in a time-multiplexed or other arbitrated manner, such that the resources appear to each guest as a dedicated set of hardware resources. However, the concurrent execution of the guests can render each guest vulnerable to unauthorized access. To protect private guest information, virtualization based security (VBS) and other virtualization security mechanisms impose security requirements, including address translation requirements, on a processing system. For example, VBS requires that a hypervisor or other guest manager provide an additional layer of address translation for virtual addressing, in addition to the address translation performed by the guest operating systems. However, these address translation demands can substantially increase the amount of memory traffic, including increasing an amount of coherency probe traffic, for the processing system as a whole, thereby undesirably increasing the power consumption of the system while also reducing overall processing efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-8 disclose techniques for managing memory traffic over an interconnect of a processing system by implementing separate buffers and watermark thresholds for coherent and non-coherent memory traffic. The processing system thereby provides the different types of traffic (that is, coherent and non-coherent requests) at different rates, and depending on different processing system conditions, such as whether processor cores receiving the traffic are in a low power state. By doing so, overall system power consumption is reduced and memory performance is enhanced.

To illustrate, in some embodiments a processing system employs an interconnect to carry memory traffic, including memory access requests and coherency probes, between different system modules, such as between a central processing unit (CPU), a graphics processing unit (GPU) and system memory in a system. The GPU is one example of a client module or client device that generates memory requests in the system. Memory "requests" and "probes" are used synonymously herein where use of "probes" and "coherency probes" generally refers to memory requests that involve determining a coherency state of a particular memory value (data in a memory location) or carrying the coherency state along with the data for a read or write memory activity. The memory traffic falls broadly into two categories: coherent memory traffic that requires coherency to be maintained between the different system modules, and non-coherent traffic that does not require coherency to be maintained. For example, memory requests that target page tables shared between the CPU and the GPU is coherent traffic, as coherency must be maintained between the local caches of the CPU and the GPU to ensure proper functioning of executing programs. In contrast, memory accesses that target frame buffer data that is only accessed by the GPU is non-coherent traffic, as the frame buffer data is not accessed by other system modules. Coherent memory traffic tends to generate a number of coherency probes, wherein before accessing a given set of data, the memory controller of a system module determines the coherency state of the data at other system modules according to a specified coherency protocol. However, servicing these coherency probes consumes system power, such as by requiring the CPU (or one or more other modules) to exit a low power state in order to service the coherency probe.

To reduce power consumption, the processing system enforces a communication protocol wherein memory traffic is provided to the CPU in a grouped, or "stuttered" fashion, depending upon the power state of the CPU or part thereof. For example, when the CPU is in a low-power mode, with or without knowing about the low-power mode, the processing system holds memory traffic in a buffer until a threshold amount of traffic is pending. The threshold amount is referred to herein as a "watermark" or "watermark threshold." By holding the memory traffic until the watermark is reached, the traffic is processed more efficiently at the CPU, caches, interconnect, and so forth. However, because non-coherent memory traffic does not generate coherency probes, the non-coherent memory traffic does not have the same impact on the CPU with respect to power consumption over time, such that using a lower watermark level for the non-coherent memory traffic is more efficient, as described further herein. Thus, using the techniques described herein, the processing system employs different buffers and corresponding different watermarks for coherent and non-coherent memory traffic, thereby improving processing efficiency. Use of a conventional, shared structure for all memory traffic results in lower performance across client modules and between coherent and non-coherent memory traffic, which is why gating of individual types of traffic is performed separately per client module.

Figure 1:
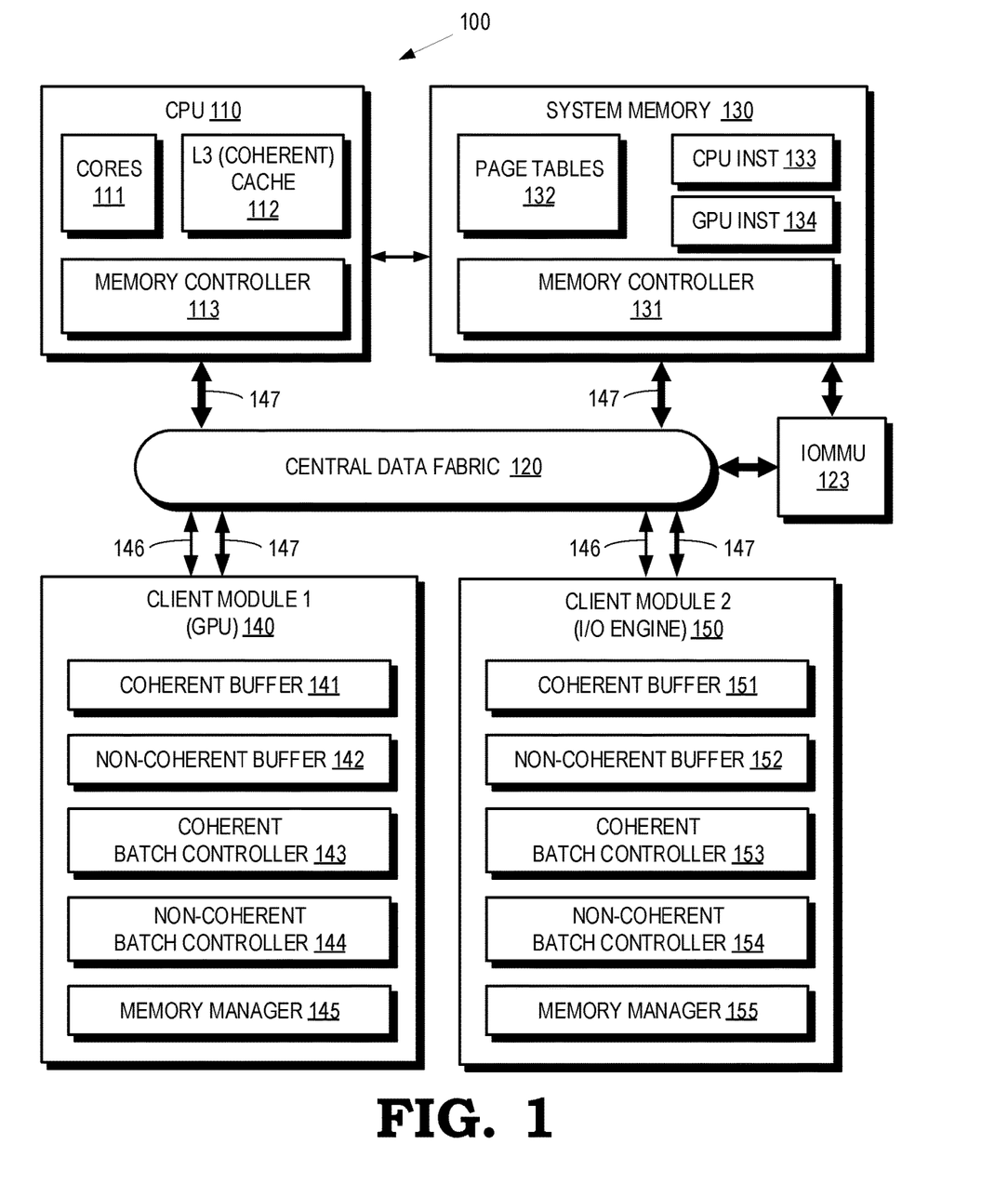
FIG. 1 is a block diagram of a system having coherent and non-coherent batch controllers in accordance with some embodiments.

FIG. 1 is a block diagram of a processing system 100 that executes sets of instructions (e.g., instructions of a computer program, instructions of an operating system process) to carry out tasks on behalf of an electronic device. Accordingly, in different embodiments, the processing system 100 is incorporated into one of a variety of different types of electronic devices, such as a desktop computer, laptop computer, server, smartphone, tablet, game console, ebook reader, and the like. To support execution of the sets of instructions, the processing system 100 includes a central processing unit (CPU) 110, a system memory 130, a first client module 140, and a second client module 150. The CPU 110 is a processing unit that executes general purpose instructions according to a specified instruction architecture, such as an x86 architecture or ARM-based architecture. The client modules 140 and 150 are modules, such as additional processing units, engines, and the like, to carry out specified operations on behalf of the CPU 110. For example, in some embodiments the client module 140 is a graphics processing unit (GPU) that executes graphics and vector processing operations and the client module 150 is an input/output (I/O) engine that executes input and output operations on behalf of itself, the CPU 110, or one or more other devices. Instructions in the system memory 130 include one or more of a CPU instruction 133 and a GPU instruction 134.

To further support execution of the instructions, the processing system 100 includes a memory hierarchy having a number of levels, with each level corresponding to a different set of memory modules. In the illustrated example, the memory hierarchy includes a system memory 130 and a Level 3 (L3) cache 112 at the CPU 110. In some embodiments, the memory hierarchy includes additional levels, such as Level 1 (L1) and Level 2 (L2) caches at one or more of the CPU 110 and the client modules 140, 150.

To access the memory hierarchy, a device (any of the CPU 110 and client modules 140, 150) generates a memory access request, such as a write request to write data to a memory location or a read request to retrieve data from a memory location. Each memory access request includes a memory address indicating the memory location of the data targeted by the request. In some embodiments, the memory request is generated with a virtual address, indicating the memory location in a virtual address space used by the computer programs being executed. The processing system 100 translates the virtual address to a physical address, as described further herein, to identify and access the physical memory location that stores the data targeted by the request. To process memory access requests, the CPU 110 includes a memory controller 113 and the system memory 130 includes a memory controller 131. Similarly, the client modules 140 and 150 include memory managers 145 and 155 operative to process memory access requests.

To ensure that the different devices (the CPU 110 and client modules 140, 150) operate on a shared set of data, the memory controllers 113 and 131 and the memory managers 145 and 155 (collectively referred to as the memory managers) together implement a specified coherency scheme, such as a MESI scheme or a MOESI scheme. Thus, the memory managers monitor the coherency state of each memory location and adjust the coherency state of a memory location based on rules defined by the specified coherency scheme.

To maintain coherency, each of the memory managers identifies whether a given memory access request targets data that are required to be kept coherent, referred to herein as "coherent data," or data that are not required to be kept coherent across the system 100, which are referred to herein as "non-coherent data." An example of coherent data is a set of data accessed through page tables (e.g., page tables 132 of the system memory 130) used to translate virtual to physical memory addresses, as these tables are typically shared between the CPU 110 and client modules 140 and 150. An example of non-coherent data is frame buffer data generated by a GPU (client module 140) the operation of which is based on one or more of the CPU instruction 133 and the GPU instruction 134. The non-coherent data are not accessed by other devices of the processing system 100. As an example for coherent data, in response to identifying that a memory access request is a coherent access request, the corresponding memory manager 145, 155 generates a set of coherency probes to determine the coherency state of the targeted coherent data at different levels of the memory hierarchy. The probes are communicated to the different memory managers, which identify the coherency state of any memory locations storing the targeted data and respond to the probe with the coherency state information from the respective locations. The originating memory manager then takes appropriate action, as defined by the specified coherency scheme, based on the coherency probe responses. Data are operated on by one or more instructions in the system memory 130 including one or more of a CPU instruction 133 and a GPU instruction 134.

In the system 100, the coherency probes and memory access requests are communicated between the different devices and system memory 130 via a central data fabric 120. The central data fabric 120 communicates with an input-output memory management unit (IOMMU) 123 that services at least some of the memory traffic 142 to and from the system memory 130 and memory traffic to and from client modules 140, 150. For example, the IOMMU 123 acts as a table walker and performs table walks across the page tables 132 as part of the coherent memory requests that cause a probe of CPU caches (e.g., L3 cache 112) and other caches in the system 100 to acquire a current coherency state. The memory traffic to and from the client modules 140, 150 includes a traffic channel 146 that updates the various coherency states by way of the IOMMU 123 and memory controllers 113, 131. The memory traffic to and from the client modules 140, 150 includes memory address translation direct memory access (DMA) traffic 147 related to contents of the system memory 130 and other memory caches in the system 100 when the DMA traffic 147 is or otherwise generates coherent memory access requests. Some DMA traffic 147 is coherent traffic and some DMA traffic 147 is non-coherent traffic.

As noted above, in some cases the coherency probes and other memory traffic increase power consumption in a processing device such as the CPU 110. To illustrate, in some embodiments the processing system 100 uses a power manager (not shown at FIG. 1) to place one or more modules of the CPU 110 (e.g., one or more of the cores 111 and the L3 cache 112) in a low-power state in response to defined system conditions, such as detecting that no operations are to be performed by the CPU 110 in a threshold amount of time. In response to a coherency probe, the processing system returns the one or more modules of the CPU 110 to an active, higher-power mode to process the probe. Thus, a large number of coherency probes, spread out over time, will cause the modules of the CPU 110 to be maintained in the active mode for a relatively large amount of time, consuming power. Accordingly, as described further below, the client modules 140 and 150 group, batch, or stutter, coherency probes and other memory traffic before providing the traffic to the central data fabric 120. This grouping allows the CPU 110 to process the probes and other memory traffic in relatively small, concentrated periods of time. This in turn increases the amount of time that the modules of the CPU 110 remain in the low-power mode, thereby conserving power. This grouping is performed for all memory traffic from the client modules 140, 150, for all DMA traffic from the client modules 140, 150, or for all coherent DMA traffic from the client modules 140, 150.

However, as noted above, non-coherent memory traffic does not result in coherency probes, and therefore does not cause the CPU 110 to be placed in the active mode. For example, the first client module (GPU) 140 reads to and writes from the system memory 130 directly such as to and from a dedicated graphics frame buffer in the system memory 130. Accordingly, and as described further below, the processing system 100 manages (e.g., groups and gates) communications of coherent and non-coherent memory traffic differently, to provide the different types of memory traffic to the central data fabric 120 at different rates and at different times and does so in same or different-sized batches for the coherent and non-coherent memory traffic. For purposes of description, it is assumed that the coherent memory traffic is traffic of a specified type, and in particular, is memory address translation requests, sometimes referred to or otherwise including a page table walk requests or one or more page table walks that generate coherent traffic. Some address translation traffic is non-coherent traffic. It will be appreciated that the techniques described herein apply to any type of coherent memory traffic distinct from other types of memory traffic.

Each memory manager 145, 155 performs functions such as address translations and walks address translation tables and operates as a type of memory management unit (MMU). Some embodiments of the client modules 140, 150 perform virtual-to-physical address translations using the memory manager 145, 155 as a virtual manager (VM) and one or more corresponding translation look-aside buffers (TLBs) (not illustrated for clarity). For example, in some cases, the VM and one or more TLBs are implemented as part of a first address translation layer that generates a domain physical address from a virtual address that is included in a memory access request received at the respective client module 140, 150 or that is generated by the client module 140, 150 itself. Some embodiments of the VM and the TLBs are implemented external to the client modules 140, 150. While not illustrated for convenience, client modules 140, 150 also include and use address translation buffers to hold various memory requests. The client module translation buffers often cannot hold all layers of a page table hierarchy.

The client modules 140, 150 also perform a certain amount of prefetching of page tables 132 where physically possible to meet one or more client module quality of service (QoS) requirements. For example, a QoS requirement is successfully processing a minimum number of DMA requests within a predetermined amount of time. The prefetching is performed by prefetch memory requests for the client modules 140, 150 and these requests can be non-coherent and coherent types of prefetch memory requests. Prefetching is performed according to a prefetching policy that is a subject of a size of a prefetch buffer of the respective memory managers 145, 155. The prefetch buffer is for data that are dependent on a property of accessible data (e.g., whether the data are in a continuous or contiguous range in the particular memory).

In operation, the client modules 140, 150 buffer memory accesses using different buffers. Coherent memory accesses that involve a memory coherency state are buffered in coherent buffers 141, 151. Non-coherent memory accesses that do not involve a coherency state, including some types of DMA instructions involving the system memory 130, are buffered in non-coherent buffers 142, 152. Both prefetch memory requests and demand memory requests are buffered in each of the respective buffers 141, 151, 142, 152 depending on their coherency/non-coherency characteristic and these buffers are in a respective client module memory or other structure that is not illustrated for sake of clarity. By way of example, demand memory requests are requests that are generated and released without delay in substantially real-time as a system operates. The memory instructions or "requests" in the client modules 140, 150 are buffered and released for execution based on operation of non-coherent and coherent monitors for non-coherent and coherent memory operations, respectively, where the monitors are part of coherent batch controllers 143, 153 and non-coherent batch controllers 144, 154, respectively, as further explained herein. The memory requests are sent out or released as a batch. Each batch released from the client device 140, 150 may include a set of non-coherent memory requests and a set of coherent memory requests or may be just of one type or the other. Broadly, the coherent batch controllers 143, 153 keep track of states of the CPU 110 and components thereof, and other components in the system 100, as needed. Address translations are performed against certain memory address tables such as a set of client memory address tables in a client module memory, in the system memory 130, or in a combination of memories in the system 100. Address translation table walks in the shared system memory 130 can be coherent and may be cached in the CPU (if present there) and hence require probing the caches such as the L3 cache 112.

For non-shared memory locations and some direct access memory locations, the non-coherent batch controllers 144, 154 gate or throttle non-coherent requests including any non-coherent address translation requests that are queued or buffered in the non-coherent buffers 142, 152 relative to a respective non-coherent threshold. In a similar manner, the coherent batch controllers 143, 153 gate or throttle memory probe requests that are queued or buffered in the coherent buffers 141, 151 that each client module 140, 150 generates. The coherent batch controllers 143, 153 gate or throttle the memory probe requests directed to one or more of the other components of the system 100. The coherent probes are responsive to one or more states of the states of the CPU 110 and components thereof, and states of any other copy in the system 100, relative to a respective coherent threshold.

Figure 2:
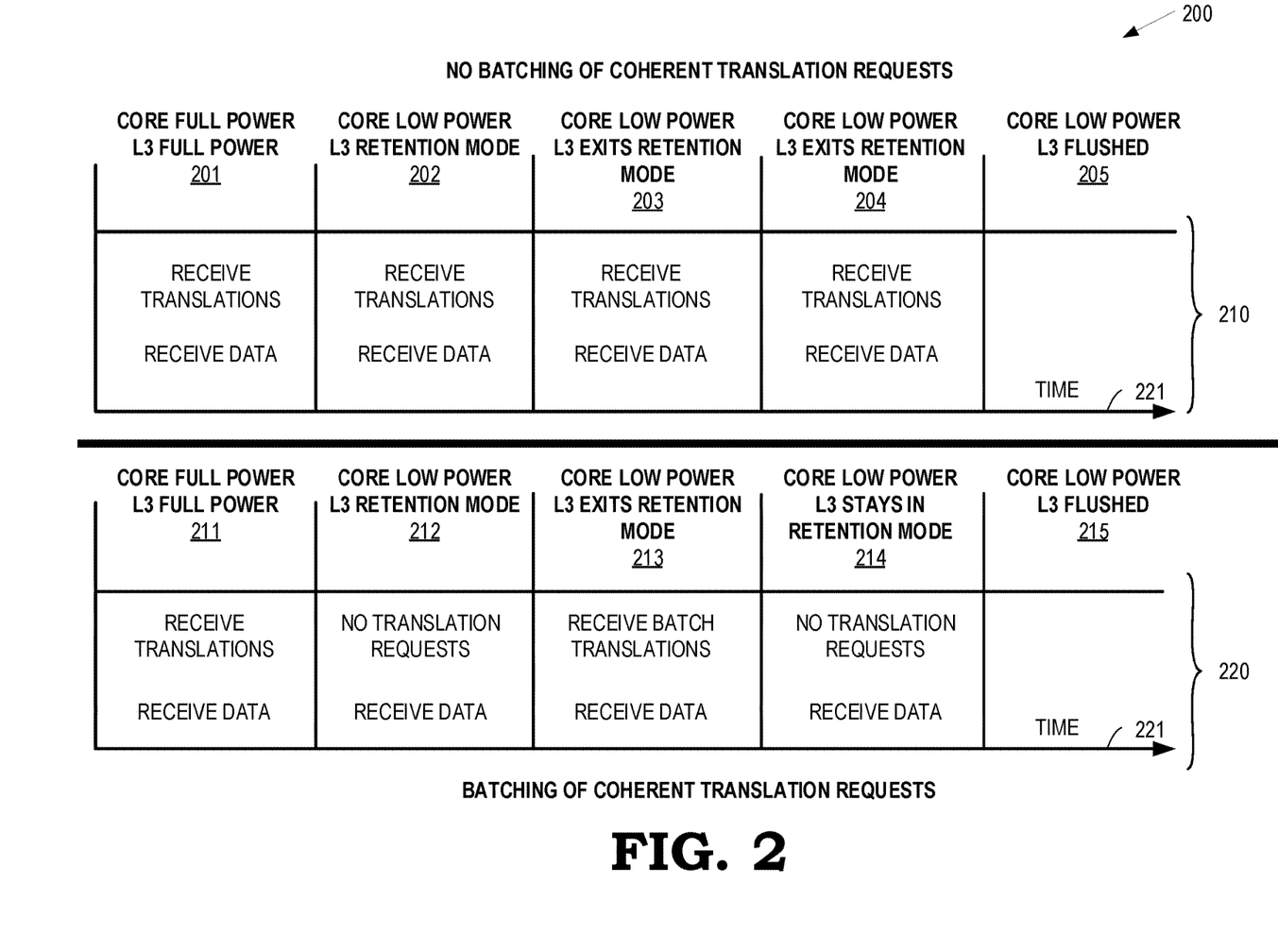
FIG. 2 is a timing diagram illustrating a method for an arbitration scheme for coherent translation requests in accordance with some embodiments.

FIG. 2 is a timing diagram illustrating a method 200 for an arbitration scheme for coherent translation memory requests in accordance with some embodiments. In a system (e.g., the system 100), steps of the method 200 are performed according to certain states of components such as the CPU 110 and the CPU caches such as the L3 cache 112. The states of the various components change over time where time is marked along a horizontal axis 221. The memory requests involved in the method 200 are both coherent and require an address translation. For example, some DMA requests fall into this category.

For reference, a conventional timing of coherent translation requests, including some DMA type of memory requests, is illustrated in a top portion 210 of the diagram and is titled "no batching of coherent translation requests." In a first state 201 of the conventional timing, a core, such as one of the cores 111, or a core complex, remains powered up and is labeled in the method 200 as full power. An L3 cache associated with the core also remains powered up in a non-power saving state. The core and L3 cache in the first state 201 of the conventional scheme continue to receive and service coherent and non-coherent memory requests without batching. In a second state 202, the system 100 places the core into a low power state and the L3 cache is placed into a retention only mode where cache coherency states and contents remain unchanged by the core 111. The core and L3 cache in the second state 202 of the conventional scheme continue to receive and service coherent and non-coherent memory requests. In a third state 203 and fourth state 204, the system 100 keeps the core in the low power state. However, in the third state 203 and fourth state 204, the L3 cache exits the retention mode to receive and service incoming coherent requests (e.g., coherency probes). As represented by a fifth state 205, at a certain time after placing the core 111 in the low power state, such as during a time of relative CPU inactivity, the L3 cache is flushed and relevant parts of the central data fabric (DF) 120 are power gated to further preserve power consumption by the system while the core 111 and its supporting structures are in their low power state.

Instead of a conventional scheme, a batching scheme for coherent translation requests is implemented and illustrated in a bottom portion 220 of the diagram. This scheme is titled "batching of coherent translation requests." In terms of timing, in a first batching state 211, the core, or a core complex, is at full power until placed into a low power state as shown in a second batching state 212. In this second state 212, the components continue to receive and service coherent and non-coherent memory requests. For example, both coherent translation requests are serviced and direct video data requests are serviced by the system 100. However, the system 100 continues or starts to batch memory address coherent translation requests based on operation of one or more of the buffers 141, 142 and the batch controllers 143, 144 for the first client module 140. The same is performed for the second client module 150 by its respective components 151-155.

Upon reaching a certain time or a certain threshold number of coherent translation requests, in a third batching state 213, the system releases the coherent translation requests and the L3 cache 112 exits its retention mode to service the coherent translation requests (labeled "translations" in the method 200). In a fourth state 214, the L3 cache 112 remains in or returns to the retention mode to preserve power and any incoming requests (e.g., coherency probes) continue to be batched and released in a subsequent state. Thus, in one or more of the second state 212 and the fourth state 214, the system 100 saves power consumption by batching at least the translation requests. As represented by a fifth state 215, at a certain time after placing the core 111 in the low power state, the L3 cache is flushed and relevant parts of the central DF 120 are power gated thereby further increasing power savings.

Figure 3:
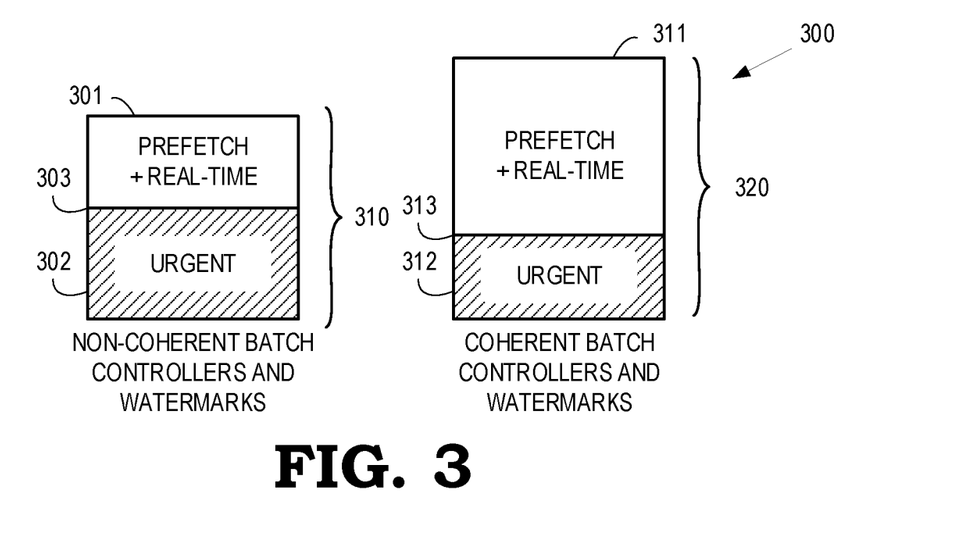
FIG. 3 is a block diagram of separate coherent and non-coherent memory bandwidth monitors in accordance with some embodiments.

FIG. 3 is a block diagram 300 of separate coherent and non-coherent batch controllers 310, 320 in accordance with some embodiments. One of each of the batch controllers 310, 320 is provided as a pair of monitors to each client module 140, 150 in the system 100. According to some embodiments, a pair of batch controllers 310, 320 is provided for each data processing or data generating unit of each client module 140, 150 as further explained herein. The batch controllers 310, 320 track respective numbers of memory requests in the system 100 for a particular client module.

According to some embodiments, each batch controller 310, 320 tracks or monitors both prefetch and demand requests 301, 311. The non-coherent batch controller 310 batches (groups) requests 301 and releases the requests 301 as urgent 302 at a same or a different urgent threshold 303 than the coherent batch controller 320 and its coherent urgent threshold 313. The coherent batch controller 320 batches requests 311 and releases requests as urgent 312 upon reaching or exceeding the coherent urgent threshold 313. In some embodiments, the batching is performed for all translation traffic or all DMA translation traffic.

The particular release timing is done at an end of a time window represented by the states in the method 200 or upon detection of the particular monitoring event such as meeting or exceeding a respective threshold. The batch controllers 310, 320 assert urgency or release of a batch of requests on respective request channels. Each batch controller 310, 320 has its own respective coherent and non-coherent buffer watermarks which are respective actual numbers of requests 301, 311 in the buffers 310, 320. When the coherent and non-coherent watermarks reach or exceed their respective urgent thresholds 303, 313, a batch of requests is sent out for completion. That is, when the batch controller 310, 320 detects a number of buffered coherent or non-coherent memory requests in its memory request buffer, the batch controller 310, 320 takes one or more additional actions.

Figure 4:
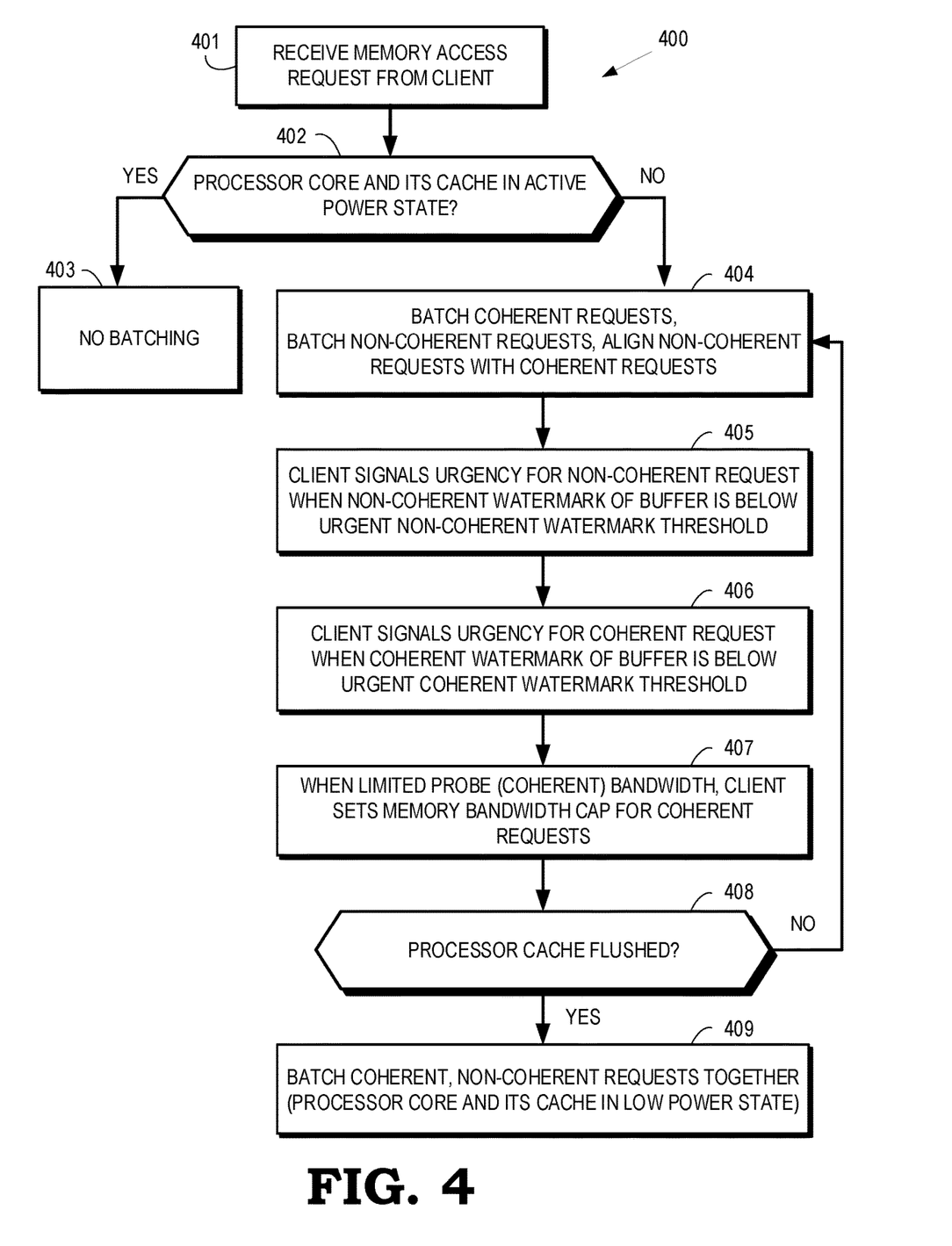
FIG. 4 is a flow diagram illustrating a method for an arbitration scheme for coherent and non-coherent memory requests in accordance with some embodiments.

FIG. 4 is a flow diagram illustrating a method 400 for an arbitration scheme for coherent and non-coherent memory requests in accordance with some embodiments to be performed in a system such as the system 100. The method 400 illustrates operation of the buffers 141, 142 and batch controllers 143, 144 and a DMA client such as a first DMA client of a client module (e.g., the client module 140) in a system. The memory access requests are generated by the DMA client or the client module 140, 150. At block 401, the system receives the memory access request from the client module.

At block 402, the system determines whether a processor core and its processor cache are each in an active power state (non-low-power state). If so, at block 403, the system 100 does not batch memory requests.

With regard to blocks 402 and 403, the system 100 determines a power state of one or more of the processor core 111 and its cache 112 in one of a plurality of ways. For example, in regard to the client module 140, the batch controllers 143, 144 of the client module 140 each receive a first signal that the processor core 111 is in a particular power state (e.g., active power state, low-power state). Based on this signal, the system proceeds to one of blocks 403, 404. When the signal is in reference to an active or full-power state, the batch controllers 143, 144 and the buffers 141, 142 operate in cooperation with the memory manager 145 (for the client module 140), an absence of the signal for active power state causes batching and aligning as further described herein.

In regard to aligning, the client module 140 releases at least some of any currently buffered non-coherent memory requests (e.g., DMA memory requests) in a same batch and at least some coherent memory requests (e.g., cache coherency probes). Release is based on a release signal generated by, for example, the client module 140 or component thereof (for a threshold event in regard to one or more thresholds 303, 313), or the CPU 110 or a component thereof such as the core 111 or a core complex (for a state event or state change in the method 200). By way of example, release occurs when either the urgent threshold 313 is crossed to release the non-coherent requests, if any, with the coherent requests, or when a component power state change is detected or signaled such as in the CPU 110. In some embodiments, alignment of requests is alignment of non-coherent memory requests with coherent memory requests such as at an edge of a time window of operation of the client module 140. "Alignment" as referenced herein is not aligning or coordinating of timing of coherent memory requests with the non-coherent memory requests unless specifically indicated. The time window of operation (e.g., represented by one of states 211-215), for buffering and release of the memory requests, includes multiple clock cycles of operation of the system 100, the central data fabric 120, the client module 140, 150, or the CPU 110.

At block 404, when the processor core and its cache are in or scheduled for a low-power state, batching is performed and certain memory requests are aligned with requests from other clients in the system 100. For example, the system batches coherent requests of the client, batches non-coherent requests, and aligns non-coherent requests from the client with coherent requests of the same client. Batching includes buffering the respective requests and releasing the requests in a group. For example, buffering includes buffering non-coherent requests and coherent requests in a first buffer. In another example, buffering includes buffering the non-coherent requests in the first buffer (e.g., the non-coherent buffer 142) and buffering the coherent requests in a second buffer (e.g., the coherent buffer 141).

Subsequent to block 404, the system 100 performs further actions when the processor core and its cache are in the low-power state. Starting at block 405 and through block 407, certain actions are performed based on operation of the batch controllers 143, 144 as explained in relation to the block diagram 300. At block 405, the system or the client signals urgency for non-coherent requests when a non-coherent watermark (current level) of non-coherent client memory requests in a non-coherent buffer is below or otherwise crosses an urgent non-coherent watermark threshold. As an example, the non-coherent watermark is a non-coherent address translation watermark threshold for a non-coherent DMA memory operation or a non-coherent shared memory operation. That is, when not enough non-coherent requests are being completed in a unit of time, the non-coherent requests are submitted for completion with an urgency indication so that the system, via the central data fabric 120, completes the non-coherent requests from the client 140, 150 in a timely fashion.

At block 406, the system or the client also signals urgency for coherent requests when a coherent watermark (current level) of coherent client memory requests in a coherent buffer is exceeds or crosses an urgent coherent watermark threshold. For example, the urgent coherent watermark threshold is a probe watermark threshold. The urgent non-coherent watermark threshold takes a same or different value than the urgent coherent watermark threshold and the thresholds operate independently of one another for the coherent and non-coherent buffers. Urgency is asserted on a respective request channel for the coherent and non-coherent requests. The thresholds are stored in a respective register in one of the components of the system 100 such as in one or more of the client module 140, 150, the central data fabric 120, the CPU 110, and the system memory 130.

At block 407, for a specific system or software application such as one running with limited probe memory bandwidth and a high or a relatively high rate of coherent memory requests, the system sets a specific bandwidth cap or maximum per unit of time or per grouping for coherent memory requests. This cap is performed in response to detecting an amount of coherent memory request activity in the system 100 such as with respect to a particular client module 140, 150. This cap is useful to spread out over time probe requests in the system 100 from a particular client module 140, 150 and to thereby more conservatively consume coherent memory bandwidth. At block 408, the system 100 determines whether the processor cache 112 is flushed. If so, buffering and releasing in batches are no longer performed as in blocks 404 through 407. Instead, at block 409, coherent and non-coherent requests are batched together to maximize fabric stutter efficiency. No consideration is given to CPU caches since these caches are flushed and have no context information to provide coherent memory requests. In some systems, batching no longer provides substantive power savings when the processor cache 112 has been flushed. If the processor cache 112 has not been flushed, activities as in blocks 404 through 407 continue until a scheduled cache flush or until the processor core 111 and its L3 cache 112 are released from the low-power mode (e.g., placed back into a full-power mode).

The method 400 is applicable to any device generating coherent and non-coherent memory requests. While not illustrated, it is understood that one state of the system 100 occurs when the processor core 111 is in the low-power state and its L3 cache 112 is in an active power state. Such state is a common state as the various memory caches service memory requests. Operations continue in the system 100 as in block 404, and over time the L3 cache 112 has opportunity to be placed temporarily into the low-power or inactive state to conserve power consumption as explained with reference to FIG. 2. Broadly, it is understood that the various components of a system that perform the method 400 include circuitry that performs the various activities of blocks 401-409 including variations thereof.

Figure 5:
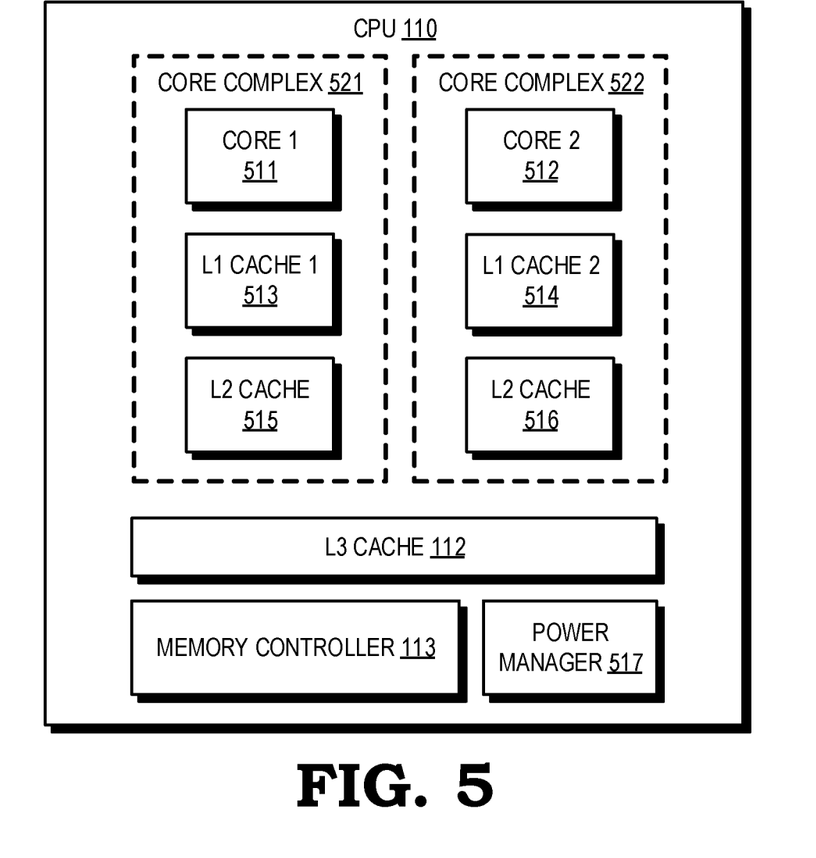
FIG. 5 is a block diagram of the processor of the system of FIG. 1 in accordance with some embodiments.

FIG. 5 is a block diagram of the CPU 110 of the system 100 in accordance with some embodiments. Besides the L3 memory cache 112 and the memory controller 113, the CPU 110 includes a power manager 517 and a first and a second core complex 521, 522. The first core complex 521 includes a first processing core 511, a first level (labeled L1) memory cache 513, and a second level (labeled L2) memory cache 515. The second core complex 522 includes a second processing core 512, a second L1 memory cache 514, and a second L2 memory cache 516. The L3 memory cache 112 is shared across the core complexes 521, 522. At least the L3 cache 112 is part of a CPU coherent context that the client modules 140, 150 use for their respective memory requests. In some embodiments, at least an L2 and an L3 cache is part of a CPU coherent context. Each of the first and the second core complex 521, 522 is independently controlled in terms of providing power thereto between at least a powered up state and a low power state. Power to the core complexes 521, 522 is controlled, for example, by the power manager 517. In other embodiments, power is managed by a respective power manager provided for each core complex 521, 522. When the CPU 110 is not under a heavy workload, one or both of the core complexes 521, 522 are placed into the low power state to reduce power consumption such as by operation of the power manager 517.

When one or both complexes 521, 522 are in the low power state, a client module 140, 150 can still be operating to read from and write to the system memory 130 and can thereby still benefit from having the current coherency state of entries in the caches of the CPU 110. After a predetermined time, entries in one or more of the caches associated with the low power core complex are flushed as it is assumed that the data and instructions therein are stale and would need to be refreshed. From time to time, the central data fabric 120 communicates a CPU state to the client modules 140, 150. The CPU state includes an active or low-power state of the CPU 110 (or an active or low-power state for each of the core complexes 521, 522) and a cache state for the same—including whether the one or more caches of the CPU 110 are flushed or not. For example, the CPU state is communicated to the memory managers 145, 155. Based on the CPU or processor state, the respective controllers 143, 144, 153, 154 trigger alignment and release of the coherent and non-coherent memory requests of the client modules 140, 150 consistent with a scheme or schedule as further described herein. A state includes state information that is used during processing. For example, when in the low-power state (a core 511, 512 or a core complex 521, 522 is offline) and the CPU caches (one or more of caches 112, 515, 516) are in a not-flushed state, a coherent memory probe sent to the CPU 110 during this state bring one or more low-power caches out of its retention state and the probe triggers the central data fabric 120 to communicate to the CPU caches. During this process, certain memory requests are batched together to reduce a time the CPU caches are out of the cache retention (low power) state to service memory address translation requests.

Figure 6:
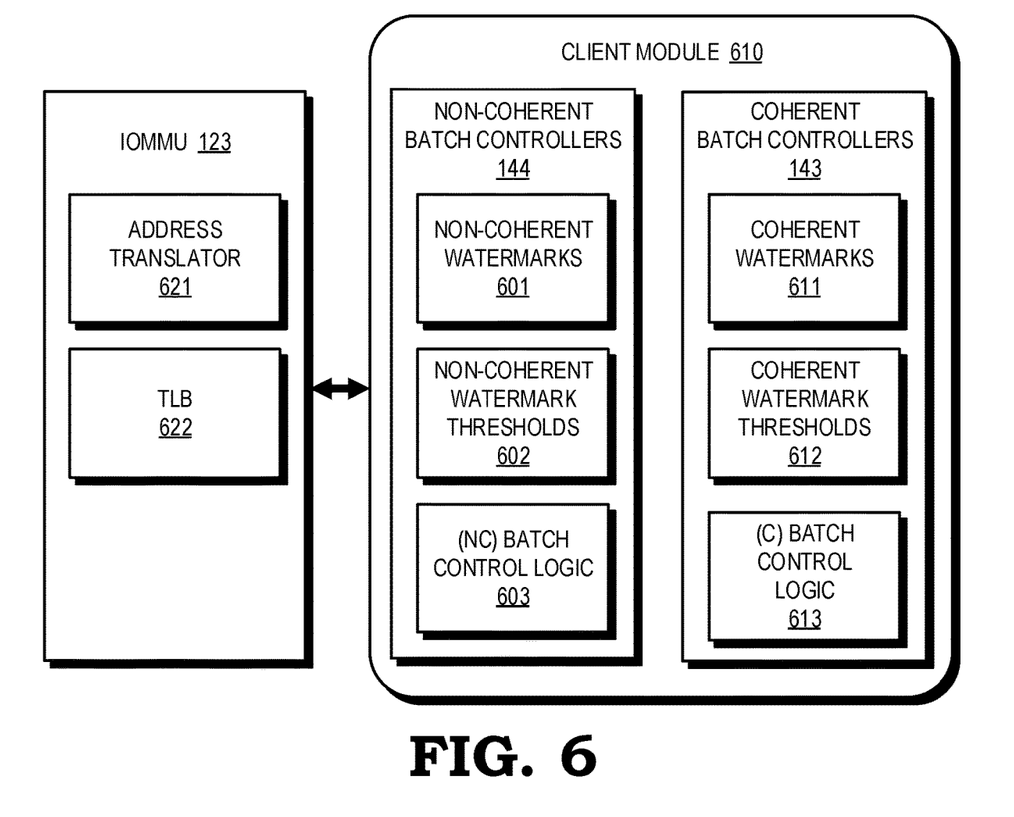
FIG. 6 is a block diagram of coherent and non-coherent controllers in accordance with some embodiments.

FIG. 6 is a block diagram of the non-coherent and coherent batch controllers 144, 143 in accordance with some embodiments in a client module 610. The non-coherent batch controller 144 includes a set of non-coherent (memory address) watermarks 601, a set of non-coherent watermark thresholds 602, and (non-coherent) batch control logic 603 that includes monitor logic for the client modules in the system 100 whereby non-coherent (e.g., non-coherent translation) requests are monitored.

The coherent batch controller 143 includes a set of coherent watermarks 611, a set of coherent watermark thresholds 612, and (coherent) batch control logic 613 that includes monitor logic for the client modules in the system 100. The batch control logic 603, 613 compares a respective watermark 601, 611 (number of the memory requests) with its matching watermark threshold 602, 612 from the particular client module. For example, batch control logic is provided for each of the client modules 140, 150 in the system 100. While the term watermark is used herein, a watermark refers to a current number of memory (e.g., coherent, non-coherent, translation, probe) requests being monitored by the respective batch control logic 603, 613.

The IOMMU 123 includes an address translator 621 and one or more translation look-aside buffers (TLBs) 622. The address translator 621 is commonly referred to, or otherwise includes, a table walker (not illustrated) whereby the address translator 621 converts a (module or device) virtual memory address into a physical memory address, such as an address in a physical memory, as understood by those in the art by walking certain page tables such as the page tables 132 of the system memory 130. Each process that is executing instructions (e.g., the CPU instruction 133, the GPU instruction 134) in the processing system 100 has a corresponding page table 132 when using virtual addresses. The page table 132 for a process translates the device-generated (e.g., virtual) addresses that are being used by the process to physical addresses in the system memory 130. For example, the IOMMU 123 performs table-walks of the page tables 132 to determine translations of addresses in the memory access requests. Translations that are frequently used by the IOMMU 123 are stored in a TLB 622 or a TLB in the system memory 130, which is used to cache frequently requested address translations. Entries are evicted from the TLB 622 to make room for new entries according to a TLB replacement policy. The TLB 622 is depicted as an integrated part of the IOMMU 123. However, in other embodiments, the TLB 622 is implemented in a separate structure and component accessible by the IOMMU 123.

For client modules 140, 150, the central data fabric 120, and the IOMMU 123 provide a translation interface to other parts of the system 100. In some embodiments, the client modules 140, 150 are high bandwidth type devices that generate a significant amount of memory traffic including a significant amount of IOMMU traffic. While not illustrated for sake of clarity, the central data fabric 120 includes one or more bus controllers as peripheral controllers that may include a system controller and a PCIe controller to communicate with the client modules 140, 150 and other components of the system 100. Client bus controllers are bidirectionally connected to input/output (I/O) hubs and buses and facilitate communication among the various components. Through the I/O hubs, the various components can send and receive data directly to, for example, the batch controllers 143, 144 of the first client module 140, and registers and memory locations in the various components in the system 100.

Figure 7:
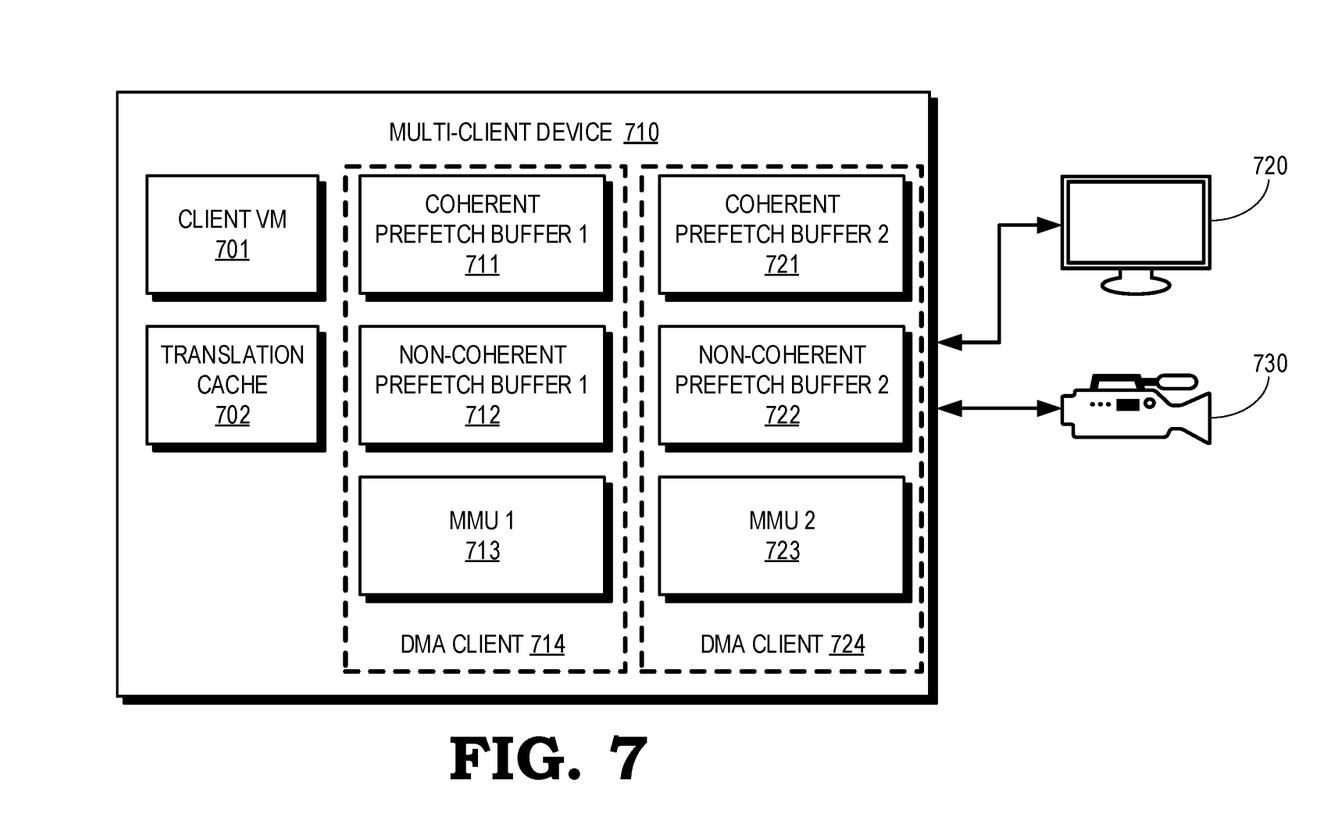
FIG. 7 is a block diagram of a client device supporting multiple direct memory access (DMA) clients in accordance with some embodiments.

FIG. 7 is a block diagram of a multi-client device 710 supporting a plurality of DMA clients in accordance with some embodiments. The device 710 is another embodiment of client modules 140, 150 of the system 100. The device 710 includes at least one client virtual manager (VM) 701, at least one memory address translation cache 702, and a plurality of DMA clients 714, 724. A first DMA client 714 includes its own coherent prefetch buffer 711, non-coherent prefetch buffer 712, and MMU 713. A second DMA client 724 includes a second coherent prefetch buffer 721, a second non-coherent prefetch buffer 722, and a second MMU 723. Each of the DMA clients 714, 724 independently reads and writes to the system memory 130. Each of the DMA clients 714, 724 is tracked by a respective translation monitor 121 and probe monitor 122 of the central data fabric 120. The first DMA client 714 is coupled to and associated with a first external device such as a display 720. The second DMA client 724 is coupled to and associated with a second external device such as a camera 730. The first MMU 713 reads and/or writes to one or both of a dedicated portion of the system memory 130 and a coherent shared portion of the system memory 130 for the display 720. The second MMU 723 reads and/or writes to one or both of a dedicated portion of the system memory 130 and a coherent shared portion of the system memory 130 for the camera 730.

Figure 8:
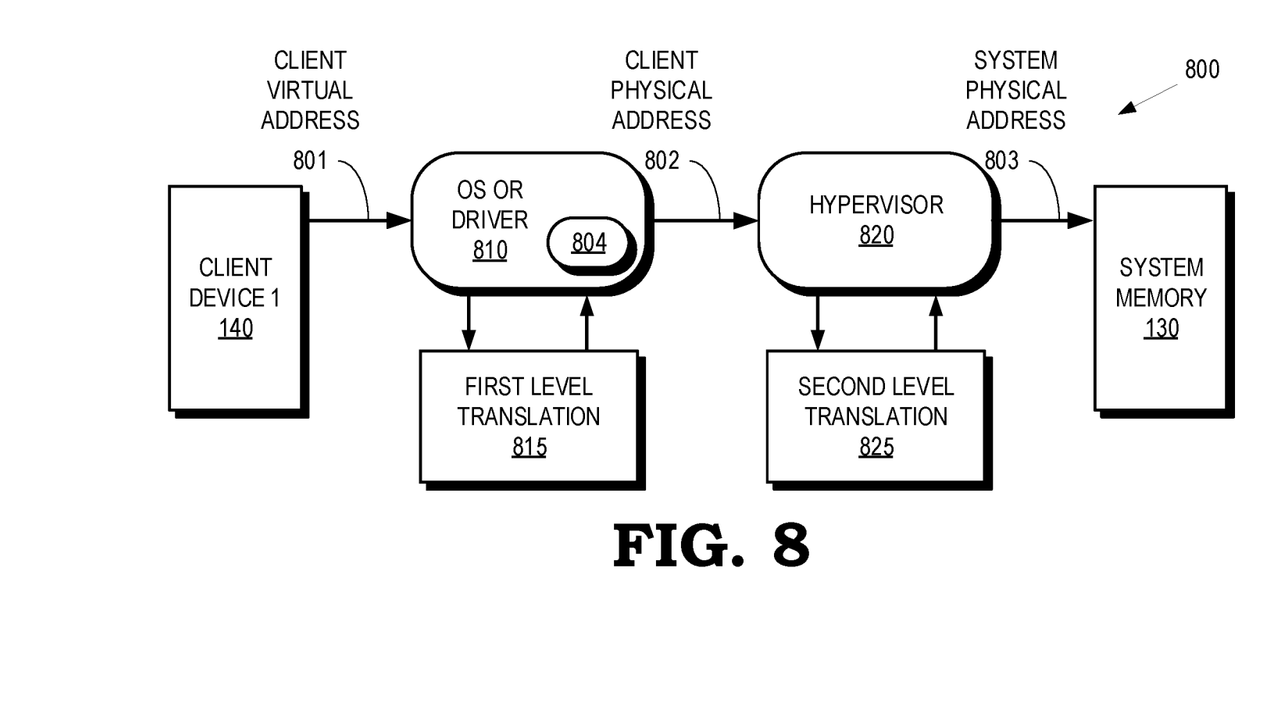
FIG. 8 is a block diagram of an address translation system in accordance with some embodiments.

FIG. 8 is a block diagram of an address translation system 800 in accordance with some embodiments. The system 800 uses the components of the system 100 to translate a client module virtual address 801 from the first client module 140 into a client module physical address 802 and then into a system physical address 803 in the system memory 130. A memory access request includes a device-generated address such as the client virtual address 801 used by an application executing on or associated with the first client module 140. In the illustrated embodiment, a VBS compliant mechanism provides memory protection (e.g., against kernel mode malware) using a two-level translation process that includes: (1) a first level translation 815 managed by an OS or device driver 810 and (2) a second layer translation 825 managed by a hypervisor 820. VBS address translation traffic and the probe memory bandwidth that this traffic consumes consequently increases CPU cache power requirements and has the potential to reduce memory performance for data accesses when VBS is used to access coherent memory such as in the system memory 130. The first level translation 815 translates the device-generated address such as the virtual address in the memory access request to a client physical address 802. The client physical address is also referred to as a domain physical address such as a GPU physical address. In some embodiments, the first level translation 815 is performed by a client module VM and associated TLB, normally associated with a guest VM, as discussed herein.

The client physical address 802 is passed to the second level translation 825, which translates the client physical address 802 into a system physical address 803 that indicates a location within the system memory 130. As discussed herein, the second level translation 825 also verifies that the device is authorized to access the particular region of the system memory 130 indicated by the system physical address 803, e.g., using permission information that is encoded into entries in associated page tables and translation lookaside buffers (TLBs) that are used to perform the second layer translation 825. In some embodiments, this translation system 800 is supported with or mediated by an IOMMU such as the IOMMU 123. Based on a setting 804 associated with the OS or the device driver 810, one or both of the watermark thresholds 602, 612 are set or adjusted relative to a starting value for the first client module 140. While illustrated for convenience in the OS or device driver 810, the setting 804 is alternatively in or associated with the hypervisor 820. In some embodiments, the setting 804 is stored in a register of the system memory 130 or in its own dedicated memory register in the client module (e.g., the GPU 140, the I/O engine 150). While a single setting 804 is shown, the setting 804 is alternatively, in certain embodiments, a plurality of values related to one or more QoS values for the particular client module 140, 150 (e.g., the GPU, the I/O engine). The setting 804 is set by a user or is programmatically obtained through a reading or a configuration detection of a hardware, firmware, or software value from an external device such the display 720 and the camera 730 coupled to the client module 150. The setting 804 can be determined upon an initialization of communication with the external device and is updated during operation of the system 100 to adjust, for example, the behavior of the controllers 143, 144 for the first client module 140.

In some embodiments, the apparatus and techniques described above are implemented in a system including one or more integrated circuit (IC) devices (also referred to as integrated circuit packages or microchips), such as the CPU 110, the system memory 130, and client devices or modules 140, 150, 710 described above with reference to FIGS. 1-8. While a buffer is described for storing or otherwise holding or tracking a memory request, another particular type of structure, device, or mechanism can be substituted as understood by those in the art. For example, instead of a buffer such as the buffers 141, 142, 151, 152 for the client modules 140, 150, a table, memory block, memory register, a linked list, and the like are used. The same applies to other circuits, components, modules, devices and the like that are described above.

Electronic design automation (EDA) and computer aided design (CAD) software tools may be used in the design and fabrication of the described IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor comprising:
   client module circuitry;
   a coherent memory request buffer having a plurality of entries to store coherent memory requests; and
   a non-coherent memory request buffer having a plurality of entries to store non-coherent memory requests;
   wherein the client module circuitry is configured to:
     buffer coherent memory requests in the coherent memory request buffer, and release a plurality of buffered coherent memory requests for processing when a quantity of the buffered coherent memory requests exceeds a first memory request threshold; and
     buffer non-coherent memory requests in the non-coherent memory request buffer, and release the buffered non-coherent memory requests for processing when a quantity of the buffered non-coherent memory requests exceeds a second memory request threshold, wherein the first memory request threshold is different from the second memory request threshold.

2. The processor of claim 1, wherein the client module circuitry is further configured to:
   receive an indication that a processor core of the processor is in a specified power state; and
   begin to buffer the coherent memory requests and buffer the non-coherent memory requests based on the received indication.

3. The processor of claim 1, further comprising:
   a memory manager for translating client virtual memory addresses of at least one of the coherent memory requests and the non-coherent memory requests into physical client memory addresses of the client module circuitry.

4. The processor of claim 1, wherein:
   the non-coherent memory requests include non-coherent prefetch memory requests.

5. The processor of claim 1, wherein:
   each of the non-coherent memory requests is to be translated based on a first memory address translation and a second memory address translation associated with a virtualization based security (VBS) mechanism.

6. The processor of claim 1, wherein the client module circuitry is further configured to:
   release the plurality of the requests when at least one of:
     a first number of buffered coherent memory requests in the coherent memory request buffer exceeds the first memory request threshold; and
     a second number of buffered non-coherent memory requests in the non-coherent memory request buffer exceeds the second memory request threshold after receiving a signal that a processor core of the processor is in a low power state.

7. The processor of claim 1, wherein the client module circuitry is further configured to:
   limit a number of coherent memory requests released from the coherent memory request buffer based on an amount of coherent memory request activity.

8. A system comprising:
   client module circuitry;
   a coherent memory request buffer having a plurality of entries to store coherent memory requests from the client module circuitry;
   a non-coherent memory request buffer having a plurality of entries to store non-coherent memory requests from the client module circuitry;
   wherein the client module circuitry is configured to:
     buffer coherent memory requests in the coherent memory request buffer, and release a plurality of buffered coherent memory requests for processing when a quantity of the buffered coherent memory requests exceeds a first memory request threshold; and
     buffer non-coherent memory requests in the non-coherent memory request buffer and release the buffered non-coherent memory requests for processing when a quantity of the buffered non-coherent memory requests exceeds a second memory request threshold that is different from the first memory request threshold.

9. The system of claim 8, wherein the client module circuitry is further configured to:
   begin to buffer the coherent memory requests and buffer the non-coherent memory requests in response to a signal indicating that a processor core in the system is in a low power state.

10. The system of claim 8, wherein:
    each of the non-coherent memory requests includes at least one of a non-coherent prefetch memory request and a demand non-coherent memory request.

11. The system of claim 8, wherein:
    the client module circuitry is configured to process each of the non-coherent memory requests using a first memory address translation and a second memory address translation consistent with a virtualization based security (VBS) mechanism.

12. The system of claim 8, further comprising:
    second client module circuitry, a second coherent memory request buffer associated with the second client module circuitry, and a second non-coherent memory request buffer associated with the second client module circuitry.

13. The system of claim 8, wherein the release of the coherent memory requests and of the non-coherent memory requests is initiated in response to receiving a release signal that is generated based on at least one of:
    a first number of buffered coherent memory requests in the coherent memory request buffer exceeding the first memory request threshold; and/or
    a second number of buffered non-coherent memory requests in the non-coherent memory request buffer exceeding the second memory request threshold after receiving a signal that a processor core of the system is in a low power state.

14. The system of claim 8, wherein the client module circuitry is further configured to:
    detect an amount of coherent memory request activity in the system; and
    limit a number of coherent memory requests released from the coherent memory request buffer based on the detected amount of coherent memory request activity.

15. A method for arbitrating device generated coherent and non-coherent memory requests, the method comprising:
    detecting a power state of a processor core and a processor shared cache; and in response to detecting a low-power state of the processor core:
  buffering coherent memory requests in a coherent memory request buffer;
  buffering non-coherent memory requests in a non-coherent memory request buffer;
  releasing coherent memory requests in the coherent memory request buffer based on a quantity of the coherent memory requests exceeding a first memory request threshold; and
  releasing non-coherent memory requests in the non-coherent memory request buffer based on a quantity of the non-coherent memory requests exceeding a second memory request threshold that is different from the first memory request threshold.

16. The method of claim 15, wherein:
releasing the one or more non-coherent memory requests and the one or more coherent memory requests includes releasing the memory requests as a batch based on the low-power state.

17. The method of claim 15, wherein:
each of the non-coherent memory requests includes at least one of a non-coherent prefetch memory request and a demand non-coherent memory request.

18. The method of claim 15, further comprising:
performing a first memory address translation and a second memory address translation consistent with a virtualization based security (VBS) mechanism for each of the non-coherent memory requests after releasing the one or more non-coherent memory requests.

19. The method of claim 15, wherein releasing the non-coherent memory requests and the coherent memory requests is based on at least one of:
  detecting a first number of buffered coherent memory requests in the coherent memory request buffer exceeding the first memory request threshold; and
  detecting a second number of buffered non-coherent memory requests in the non-coherent memory request buffer exceeding the second memory request threshold after receiving a signal that the processor core is in the low-power state.

* * * * *